2,750,400

PREPARATION OF PHYTIC ACID FROM CALCIUM MAGNESIUM PHYTATES

John C. Cowan and Cyril D. Evans, Peoria, Ill., assignors to the United States of America as represented by the Secretary of Agriculture No Drawing. Application June 22, 1951,
Serial No. 233,096

2 Claims. (Cl. 260—461)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the preparation of phytic acid from phytate salts. More particularly, it relates to the preparation of phytic acid from its alkaline earth metal salts, for example, calcium magnesium phytate. The latter compound has the following formula:

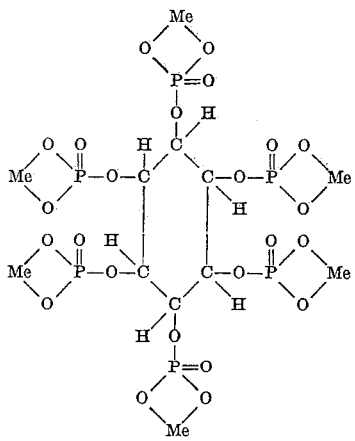

in which Me represents the calcium ion or the magnesium ion. Commercial calcium magnesium phytate, as recovered from steep water in the corn milling industry, contains about 8–10 percent calcium and about 2 percent magnesium.

Heretofore, phytic acid has been prepared from such sources as calcium magnesium phytate by first dissolving in a strong acid and then precipitating by the addition of iron or copper to obtain the phytic acid as its corresponding iron or copper salt. From these precipitated salts, phytic acid may be recovered by treatment with $H_2S$. It is also known to prepare soluble calcium salts of phytic acid by dissolving calcium magnesium phytate in a strong mineral acid and mixing the solution with alcohol.

These prior methods for preparing phytic acid are relatively cumbersome and expensive. As a result, even though phytic acid occurs relatively abundantly in plant materials, such as corn, rice, oats, etc., it can be conveniently recovered only as calcium magnesium phytate. Heretofore, no satisfactory method has been provided for the economic recovery of phytic acid from this salt.

Phytic acid is useful as an organic intermediate for the preparation of inositol and is useful per se as a heavy metal scavenger in the preservation of materials subject to oxidation deterioration.

According to the invention, we first provide an acid solution of a calcium or similar salt of phytic acid, such as calcium magnesium phytate. This may be done by dissolving the salt, for example, in hydrochloric acid or other mineral acid. This acid solution of the phytic acid salt is then passed through a bed of cation exchange material. When the correct conditions are observed, the effluent from the cation exchange treatment is a solution of phytic acid in the mineral acid. Further, according to the invention, the acid effluent is treated to remove the mineral acid and is subsequently concentrated to recover the phytic acid.

The acid in the initial phytate solution is preferably a relatively volatile acid, such as hydrochloric or other hydrohalic acid, chloracetic acid or the like. We prefer these acids for the reason that subsequent removal from the cation exchange effluent is rendered relatively simple. It can be done, for example, by simple steam stripping. However, we may use less volatile acids, such as sulfuric acid, in the phytate solution, and remove the sulfate ion from the effluent by treatment with stoichiometric amounts of a barium salt, such as barium chloride. This will then give the equivalent amount of HCl, which may be removed by stripping or evaporation.

The strength of the acid used to dissolve the phytate salt is not critical, provided sufficient acid is present to release the phosphoric acid groups. The strength may vary, therefore, over a considerable range. For reasons of convenience, we prefer to dissolve with an acid of 1.5–15 percent strength.

The acid solution of phytate may be prepared by acidifying an aqueous solution thereof with sufficient amounts of strong acid to release the phosphoric acid groups, thus to displace the cations of the phytate and render them available for exchange. However, as previously stated, we prefer to prepare the phytate-acid solution simply by dissolving the phytate in sufficient strong acid to liberate all the phosphoric acid groups of the phytate, thus rendering the cations available for exchange. In practice, it is convenient to add a considerable excess of the strong acid, and we have actually found this procedure desirable in order to leach or dissolve commercial calcium magnesium phytate.

The cation exchange substance may be any of those familiar in the art. For reasons of convenience, we prefer the sulfonated coal type. We may use, however, any of the natural or synthetic materials which exchange cations. Examples are zeolites, phenol sulfonic acid resins, and the like.

After use in the process the ion exchange substance can be regenerated with strong acid in the normal manner. Recovery of phytic acid from the effluent is preferably accomplished by stripping off the volatile strong acid. This step usually may be combined with the step of concentrating the phytic acid solution to reduce its volume. The resulting syrup may then be used for many of the purposes to which phytic acid may be put. If desired, however, phytic acid may be recovered in solid form by crystallization.

The following specific examples illustrate the invention.

Example 1

The acid solution of phytate salts was prepared by dissolving 50 grams of commercial calcium-magnesium salt of phytic acid in about 1000 ml. of 2 percent HCl. The mixture was heated for about an hour, whereupon the resulting solution was filtered and the filtrate concentrated slightly on a steam bath at reduced pressure. The material filtered off consists mostly of insoluble calcium salts and other impurities.

The resulting solution of calcium magnesium phytate was passed through a bed of cation exchange resin (sulfonated soft coal, acid washed). The bed of resin (700 ml.) was in the shape of a column.

The effluent phytic acid solution, containing HCl, was evaporated on a steam bath under a vacuum until removal of HCl was complete. The phytic acid was then further evaporated to a thick syrup. It was compared for purity with a known sample of phytic acid and titrated exactly the same to methyl orange and phenolphthalein indicators.

*Example 2*

A larger quantity of calcium magnesium phytate (500 g.) was dissolved as in Example 1. The solution was passed through a proportionate quantity of IR 100 resin, a sulfonated soft coal resin. Sufficient acid was used in the dissolving step to insure the presence of HCl in the solution at all stages up to the steam removal step. Tha HCl was removed from the effluent solution and the resulting phytic acid concentrated as in Example 1.

The concentrated phytic acid solution obtained from the HCl stripping is a syrup of about 80 percent or more solids. The solution is a thick liquid having the consistency of molasses. In order to remove the solutions from the stripping flasks they are diluted to 50–60 percent solids, whereupon the solutions poured easily.

The HCl stripping may be repeated two or three times to insure complete removal, by adding water and reconcentrating.

*Example 3*

Example 2 was repeated, doubling the amounts of reagents and resin.

The combined products of Examples 1, 2, and 3 gave a yield of 98 percent based on the phytic acid present in the original calcium magnesium phytate. The syrups from each of the examples averaged about 57 percent solids. These syrups may be utilized for the synthesis of inositol or for addition to glyceride oils to prevent oxidative deterioration. However, if desired, the phytic acid may be recovered in crystalline form. The acid is quite hygroscopic, however, and is troublesome to handle and store in its crystalline form.

Instead of calcium magnesium phytate used in the foregoing examples, we may also use calcium phytate, magnesium phytate or other alkaline earth, alkali metal or heavy metal phytates.

We claim:

1. Method which comprises dissolving calcium magnesium phytate in dilute hydrochloric acid, said hydrochloric acid being in amount sufficient to liberate the phosphoric acid groups of the calcium magnesium phytate, contacting said acid solution with a cation exchange material thereby to remove calcium and magnesium ions from the solution and removing HCl from the solution by evaporation.

2. The method which comprises dissolving a phytate alkaline earth metal salt in a quantity of acid from the group consisting of hydrochloric acid, chloracetic acid, and sulfuric acid sufficient to liberate the phosphoric acid groups of said phytate, treating said acid solution with a cation exchange material thereby to exchange the cation of the solution and thus liberate phytic acid in the presence of a residual amount of original acid, then removing the residual amount of acid from the phytic acid solution.

References Cited in the file of this patent

UNITED STATES PATENTS

| | | |
|---|---|---|
| 1,715,031 | Goedecke | May 28, 1929 |
| 2,691,035 | Thomas | Oct. 5, 1954 |

OTHER REFERENCES

Stainier: Jour. Pharm. et Chim., vol. 23, pp. 641–645 (1936).

McCready: J. Am. Chem. Soc., vol. 66, pp. 560–563 (1944).

Iselin: J. Am. Chem. Soc., vol. 71, pp. 3822–3825 (1949).

"Amberlite IR–100," pamphlet by Rohm & Haas Co., M–13–46.